United States Patent [19]
Singh et al.

[11] Patent Number: 5,770,126
[45] Date of Patent: Jun. 23, 1998

[54] HIGH PRODUCING RATE OF NANO PARTICLES BY LASER LIQUID INTERACTION

[75] Inventors: Jogender Singh; Eric Whitney; Paul E. Denney, all of State College, Pa.

[73] Assignee: The Penn State Research Foundation, University Park, Pa.

[21] Appl. No.: 708,425

[22] Filed: Sep. 5, 1996

[51] Int. Cl.⁶ ............................. B29B 9/00; B05B 17/04
[52] U.S. Cl. ............................ 264/8; 264/10; 75/333; 75/336
[58] Field of Search ............................ 264/8, 10, 12; 75/333, 336

[56] References Cited

U.S. PATENT DOCUMENTS 4,482,375  11/1984  Sastry et al. ........................... 75/333
4,689,074  8/1987  Seaman et al. ........................ 264/10

*Primary Examiner*—Mary Lynn Theisen
*Attorney, Agent, or Firm*—Thomas J. Monahan

[57] ABSTRACT

The present invention is a process and apparatus for producing nano-scale particles using the interaction between a laser beam and a liquid precursor solution. There are two embodiments. The first embodiment includes the use of a solid substrate during the laser-liquid interaction. In this embodiment the laser beam is directed at the solid substrate which is immersed in the liquid precursor solution and rotating. The second embodiment includes the use of a plasma during the laser-liquid interaction. In the second embodiment, a mixture of a liquid precursor and a carrier gas is injected into a laser beam. Injection of the mixture can be performed either perpendicular or parallel to the laser beam. The apparatus for injecting the liquid precursor and carrier gas into the laser beam includes a plasma nozzle designed to allow the laser beam to enter the plasma nozzle so that the laser beam may irradiate what is flowing through the plasma nozzle to create a plasma flow. The carrier gas allows for the formation of a plasma by its interaction with the laser beam. The liquid precursor is allowed to atomize into fine droplets. These fine droplets are exposed to the laser beam along with the plasma. The photon energy from laser beam and plasma energy induce the breaking of the molecular bond of the liquid precursor which results in the formation of ultra-fine elemental powders.

8 Claims, 14 Drawing Sheets

HIGH PRODUCING RATE OF NANO PARTICLES BY LASER LIQUID INTERACTION

GOVERNMENT SPONSORSHIP

This invention was made with Government support under Contract No. N00039-C-92-0100 awarded by the U.S. Department of the Navy. The Government has certain rights in the invention.

CROSS-REFERENCE TO RELATED APPLICATIONS

This application claims the benefit of U.S. Provisional Application No. 60/003,349 filed Sep. 7, 1995.

BACKGROUND

The production of sub-micrometer (100 nm<diameter<1 μm) and nano-scale (1 nm<diameter<100 nm) particles has received attention in both basic science and advanced technology research. There is a growing interest in producing clusters and nano-scale crystalline material for potential catalytic, sensor, aerosol, filter, biomedical, magnetic, dielectric, magnetic structural, opto-electronic structural, ceramics and metallurgical applications. This is because nano-scale particles exhibit volume effects and surface effects absent in the same material with dimensions in the micrometer range. Nano-scale particles have unique physical properties (e.g. optical, dielectric, magnetic, mechanical), transport properties (e.g., thermal, atomic diffusion) and processing characteristics (e.g., faster sintering kinetics, super-plastic forming).

The nano-scale particles provide a narrow size distribution which is required to obtain a uniform material response. Materials such as paints, pigments, electronic inks, and ferrofluids, as well as advanced functional and structural ceramics require that the particles be uniform in size and stable against agglomeration. Fine particles, particularly nano-scale particles with significant surface area, often agglomerate to minimize the total surface or interfacial energy of the system. Although the process of using solution chemistry can be a practical route for the synthesis of both submicrometer and nano-scale particles of many materials, issues such as the control of size, distribution of particles, morphology and crystallinity, particle agglomeration during and after synthesis and separation of these particles from the reactants needs further investigation.

The usual synthesis techniques for producing nano-scale particles include mechanical milling of solid phases, solution chemistry and vapor-phase synthesis. Nano-scale structured particles have also been synthesized by chemical techniques such as chemical precipitation, and sol-gel processing. Also, vapor deposition of nano-scale particles has been achieved by gas evaporation, laser ablation and sputtering. Each of the mentioned synthesis techniques provide their own particular specific advantages, but they also have the following individual disadvantages which require the search for an improved process for producing nano-scale particles. Mechanical milling allows contamination to the particles and a particle size of less than 100 nm can not be produced. Solution chemistry, vapor phase synthesis, chemical precipitation, sol-gel processing and vapor deposition are processes that are very slow and are difficult to control in order to acquire a desired size and shape of the nano-scale particles to be produced. Many of these synthesis techniques also require the use of a vacuum unit and involve environmental concerns about chemical waste disposal.

It is an objective of the present invention to increase the quality and synthesis rate of nano-scale particles by laser-liquid interaction. It is also the objective of the present invention to provide improved control of the size of nano-scale particles to be produced. It is further the objective of the present invention to have a process to produce nano-scale particles that is more economical, cost effective and environmentally compliant.

SUMMARY OF THE INVENTION

The present invention is a process and apparatus for producing nano-scale particles using the interaction between a laser beam and a liquid precursor solution. There are two embodiments. The first embodiment includes the use of a solid substrate during the laser-liquid interaction. In this embodiment the laser beam is directed at the solid substrate which is immersed in the liquid precursor solution and rotating. The apparatus used includes a reactive chamber which allows the entrance of the laser beam and a rotating specimen holder driven by an external or internal drive source. The laser beam interacts with the solid substrate through the liquid precursor solution converting the laser beam to thermal and photon energy. During the laser-liquid-solid interaction, the molecules of the liquid precursor solution undergo photofragmentation. These molecules absorb laser photons and are raised to an unstable excited state. The molecules release excess energy by splitting into fragments. The dissociation of the molecules by splitting results in the formation of nano-scale particles. After the photon dissociation of the liquid precursor molecules, the heat generated in the localized irradiated area of the solid substrate results in the growth of the nano-scale particles.

The second embodiment includes the use of a plasma during the laser-liquid interaction. In the second embodiment, a mixture of a liquid precursor and a carrier gas is injected into a laser beam. Injection of the mixture can be performed either perpendicular or parallel to the laser beam. The apparatus for injecting the liquid precursor and carrier gas into the laser beam includes a plasma nozzle designed to allow the laser beam to enter the plasma nozzle so that the laser beam may irradiate what is flowing through the plasma nozzle to create a plasma flow. The carrier gas allows for the formation of a plasma by its interaction with the laser beam. The liquid precursor is allowed to atomize into fine droplets. These fine droplets are exposed to the laser beam along with the plasma. The photon energy from laser beam and plasma energy induce the breaking of the molecular bond of the liquid precursor which results in the formation of ultra-fine elemental powders; A collection chamber is used to collect the nano-scale particles and is vented to release the remaining gases.

DESCRIPTION OF THE PREFERRED EMBODIMENTS

The present invention provides for the synthesis of nano-scale particles from a liquid precursor by a laser-liquid interaction. The use of the present invention allows a high quality of nano-scale particles to be produced at a higher rate; allows better control of particle size; and provides a synthesis process that is more economical and cost effective then prior synthesis techniques.

Figure 1:
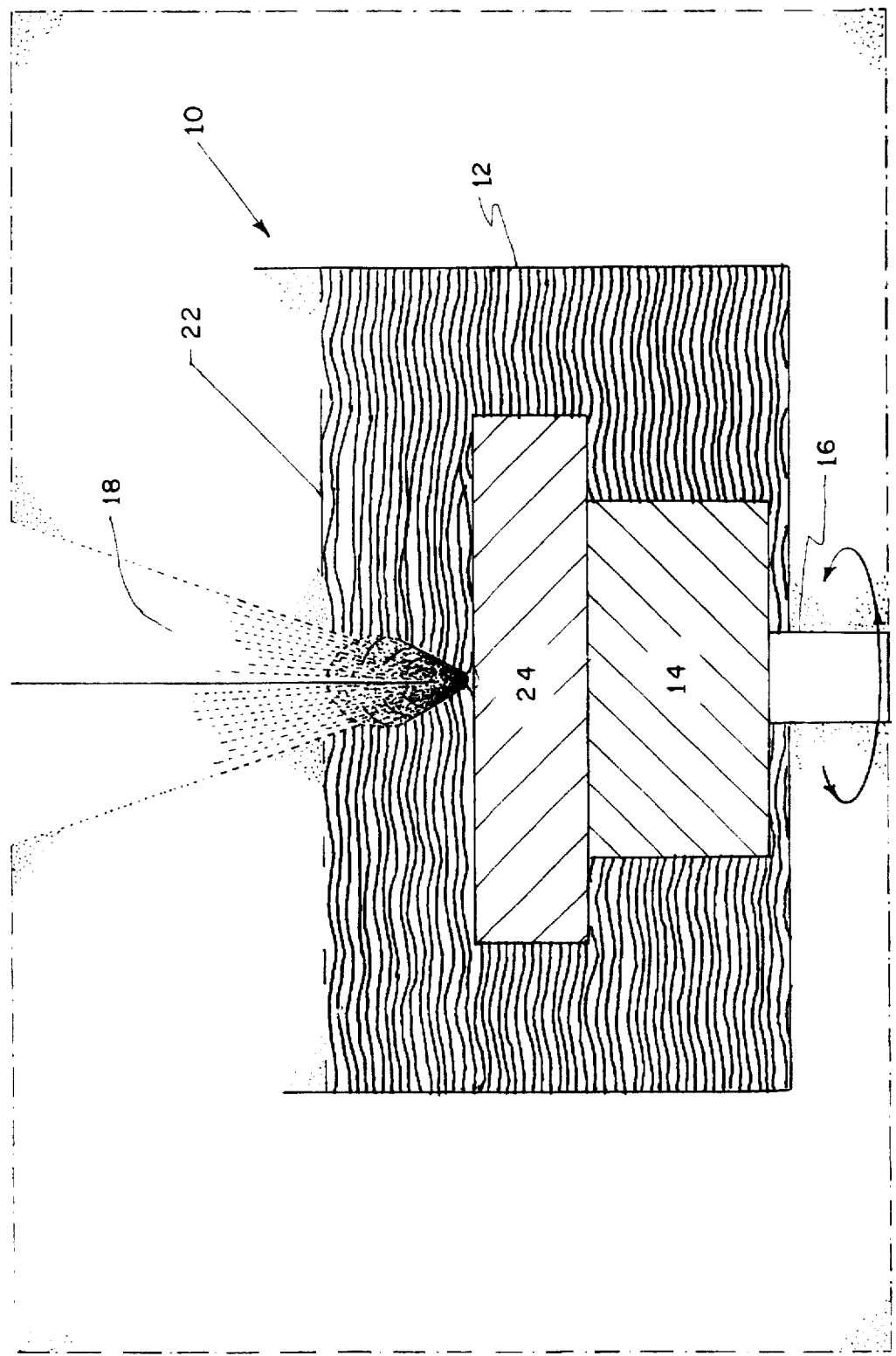
FIG. 1 is a schematic view of the apparatus used in the first embodiment of the present invention.

A first embodiment of the present invention is shown in FIG. 1. FIG. 1 is a schematic diagram of an apparatus 10 used in the first embodiment of the present invention for the production of nano-scale particles by laser-liquid-solid interaction. The apparatus includes a reactive chamber 12 which can be of an open or closed type. The reactive chamber 12 includes a specimen holder 14 which is rotatable within the reactive chamber 12. The specimen holder 14 is rotated by a drive source 16 which can be internal or external to the reactive chamber 12. If the reaction chamber 12 is of a closed type, there must be an opening or port to allow the entrance of a laser beam 18 from a laser (not shown).

To produce the nano-scale particles using the apparatus of the first embodiment, a liquid precursor solution 22 is placed in the reaction chamber 12. A solid substrate 24 is immersed in the liquid precursor solution 22 and secured to the specimen holder 14. The solid substrate 24 is aligned on the specimen holder 14 to be irradiated by the laser beam 18 from the laser. The solid substrate 24 is chosen to be non-reactive or at least minimally-reactive with the liquid precursor solution 22. The laser beam 18 interacts with the solid substrate 24 through the liquid precursor solution 22 converting the laser beam 18 to thermal and photon energy.

During the laser-liquid-solid interaction, the molecules of the liquid precursor solution 22 undergo photofragmentation. These molecules absorb laser photons and are raised to an unstable excited state. The molecules release excess energy by splitting into fragments. The dissociation of the molecules by splitting results in the formation of nano-scale particles. After the photon dissociation of the liquid precursor molecules, the heat generated in the localized irradiated area of the solid substrate 24 results in the growth of the nano-scale particles. The continuous rotation of the solid substrate 24 by the specimen holder 14 during laser-liquid interaction with the laser beam 18 distributes the powder nano-scale particles formed in the irradiated solution and prevents agglomeration due to continual interaction with the laser beam 18. The synthesized nano-scale particles are then separated from the solution by a centrifugal separator after removal from the reaction chamber 12.

This laser beam-liquid-solid interaction technique of the first embodiment for the production of ultra fine particles eliminates many of the disadvantages of the previously mentioned synthesis techniques. The nano-scale particles produced by this laser-liquid interaction technique are highly spherical and are homogeneous in size. Under these conditions, the nucleation is homogeneous, i.e., the nuclei appear spontaneously. The size of the nano-scale particles can be varied depending upon the laser processing conditions which include laser beam power, beam diameter, focus condition, laser interaction time and the concentration of the reaction solution. Highly spherical particles of many metals in the nano-scale regime can be produced by the careful optimization of the laser process conditions.

Figure 2:
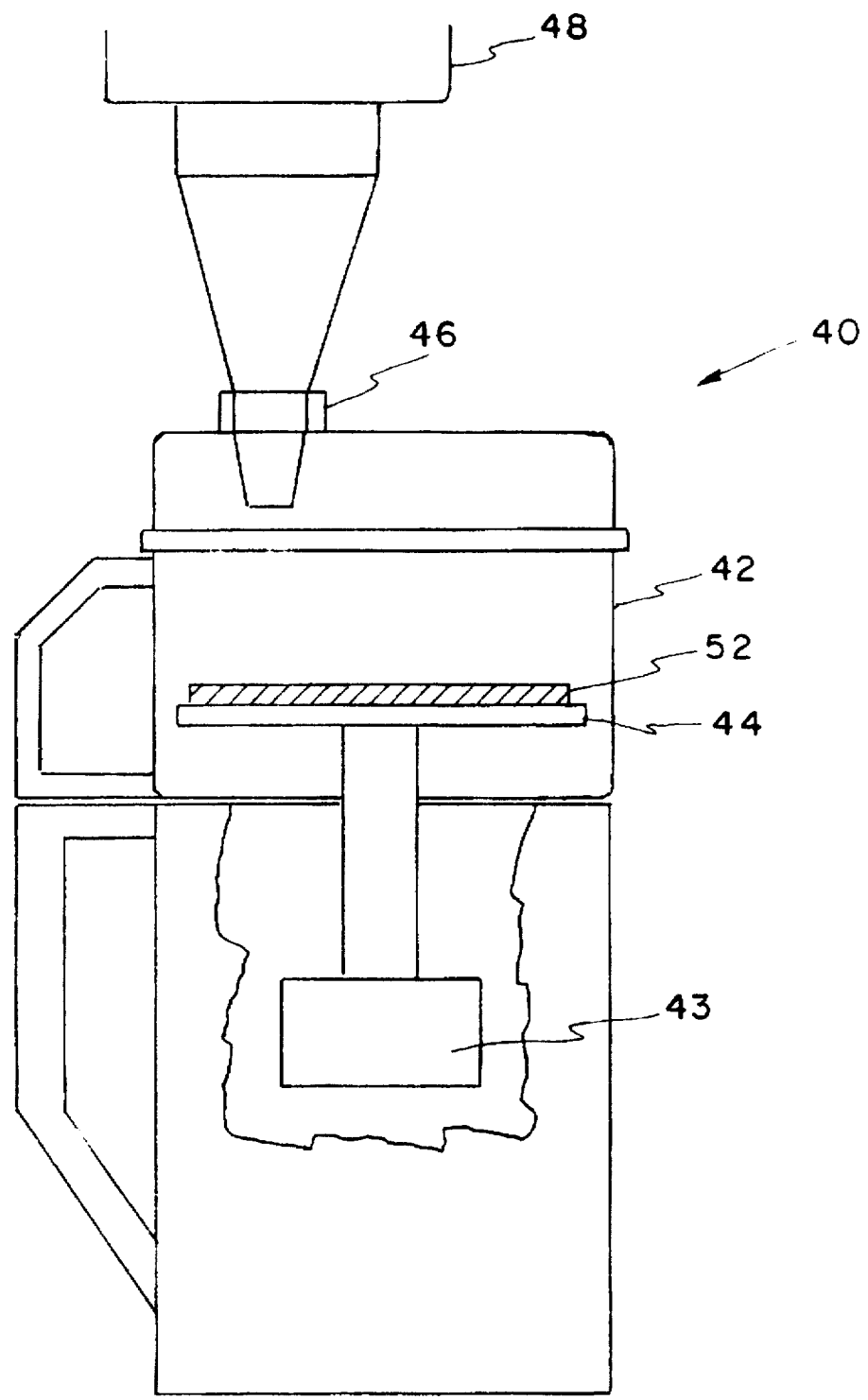
FIG. 2 is a side view of the apparatus used for experimental production of nano-scale particles using the process of the first embodiment of the present invention.

Experimental Production of Silver Nano-scale Particles using the First Embodiment The following will describe the experimental production of silver nano-scale particles using the technique and apparatus of the first embodiment. For this experiment a typical food processor 40 was used as a reaction chamber 42 and drive source 43 to rotate the specimen holder 44 as shown in FIG. 2. The specimen holder 44 was a disc with a cutout in the center so that it could be attached to the drive 43 of the food processor 40. A stainless steel substrate 52 was place on the rotatable specimen holder 44. An opening 46 in the food processor 40 was used to insert the laser 48. The liquid precursor solution used was silver nitrate (AgNO3) dissolved in distilled water. The reaction chamber 42 was filled with the liquid precursor until it was about three to four millimeters above the stainless steel substrate 52. While the stainless steel substrate 52 was rotated by the specimen holder 44, it was irradiated by a laser beam from laser 48. Rotation speed of the specimen holder 44 was about 700 revolutions per minute. A CW C02 laser having laser-beam power of 275, 300 and 400 watts at focus and defocused conditions was used. The laser beam diameter was 3 mm and the interaction time with the stainless steel substrate 52 was three to seven minutes. The synthesized silver nano-scale particles were separated from the solution by a centrifugal separator at 12,000 rpm.

The results for the experimental production of synthesized silver nano-scale particles were characterized by the following various techniques. X-ray diffraction results were carried out using Cu $K_\alpha$ radiation with a single crystal monochromator. Characteristic bragg diffraction angles in the x-ray diffraction profile obtained from the Ag-powder sample were compared with the Ag-standard diffraction profile. The size, shape, and distribution of the nano-scale particles produced were examined using the JEOL JSM-6300F high resolution scanning electron microscope (SEM) equipped with a field emission gun. The microchemistry of the nano-scale particles were determined using Cameca SX-50 electron microprobe equipped with an energy dispersive spectrometer. The wavelengths and energies of the x-rays characteristic of the elements in the powder sample were measured and the elements present were identified.

Figure 3:
FIG. 3 is a SEM micrograph of the nano-scale crystalline silver particles using the first embodiment of the present invention.
Figure 4:
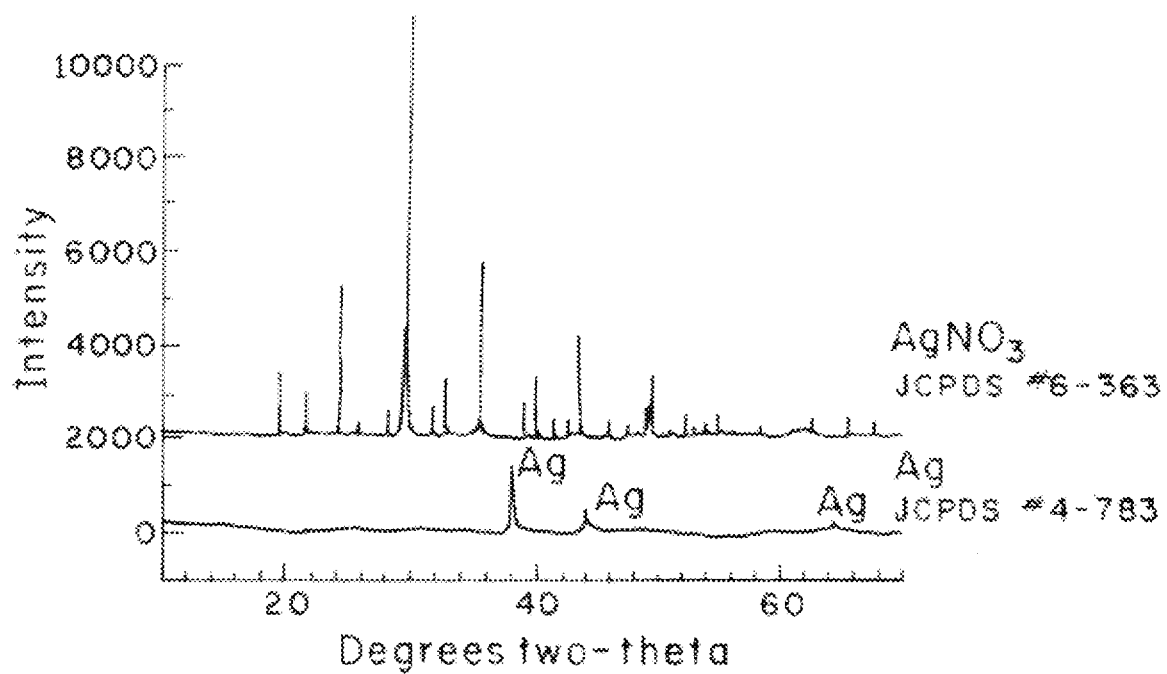
FIG. 4 is a graph of the corresponding x-ray diffraction pattern obtained from the powder produced using the first embodiment of the present invention.
Figure 5:
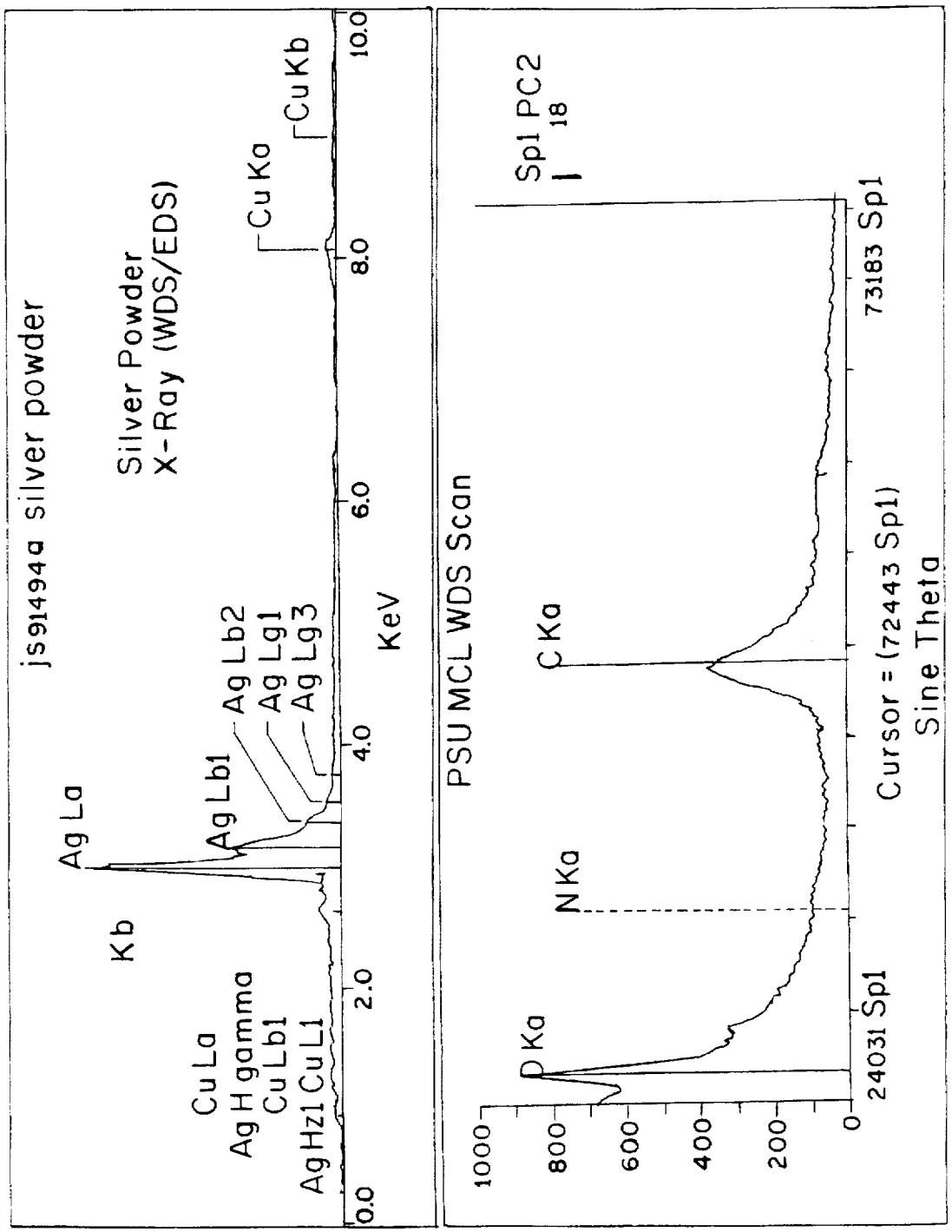
FIG. 5 is a graph of the x-ray microchemical data obtained from the silver nano-scale particles produced by the first embodiment.

FIG. 3 shows the SEM micrograph of the nano-scale crystalline silver particles synthesized from the silver nitrate solution using a focused CW C02 laser-beam at a power of 275 watts and an exposure time of three minutes. The average size of nano-scale particles is about 20 nm. The corresponding x-ray diffraction pattern obtained from the powder is displayed in FIG. 4 indicating that the silver nano-scale particles are crystalline in nature. FIG. 4 also shows an x-ray diffraction pattern taken from the anhydrous silver nitrate crystals (starting material). The same Ag-powder sample was further examined in the electron microprobe. The x-ray microchemical data obtained from the nano-scale particles using the electron microprobe is shown in FIG. 5. The characteristic peaks from the elemental silver have been identified. The absence of characteristic peaks from nitrogen and oxygen indicates that the powder particles produced are free from oxygen (i.e., oxide formation) and nitrogen. Thus, high quality nano-scale silver particles were formed by this novel laser-liquid interaction technique.

Figure 6:
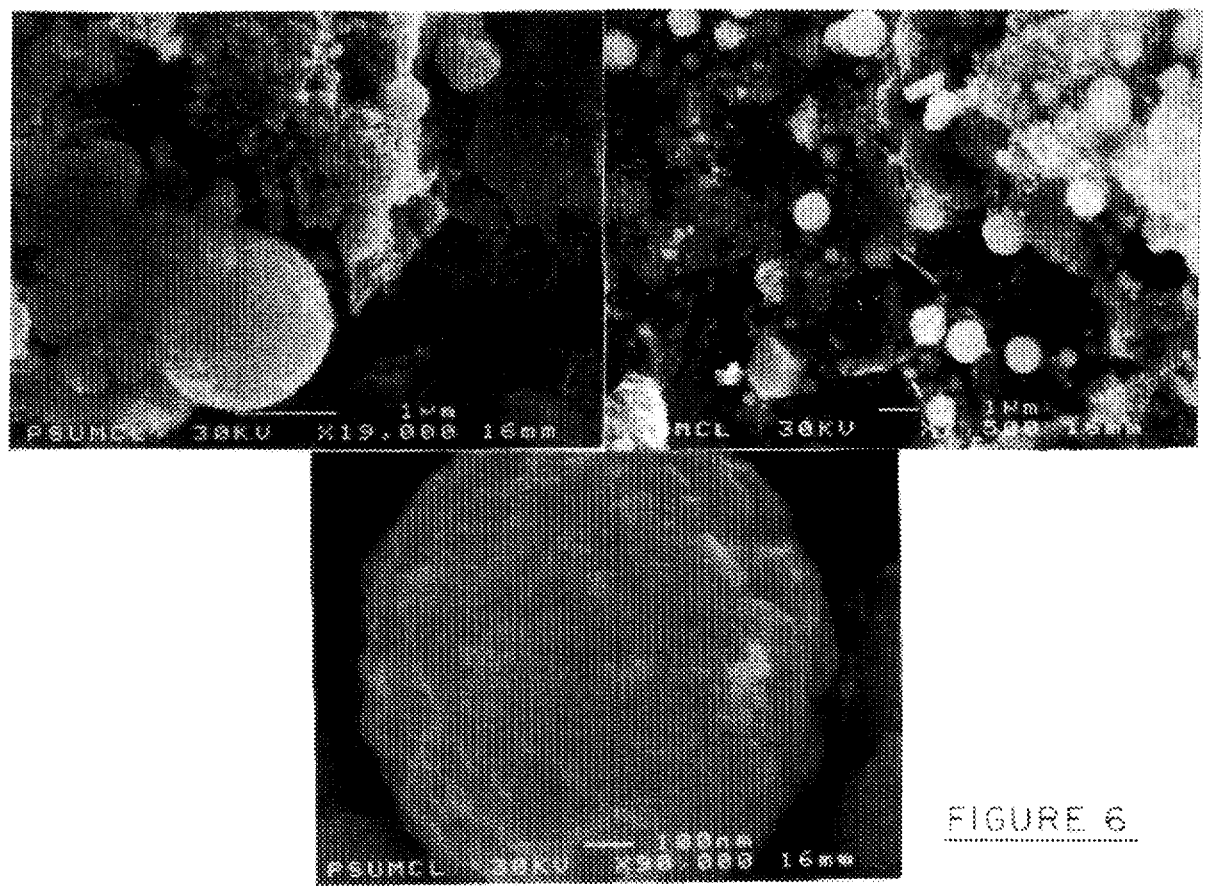
FIG. 6 are the SEM micrographs of the nano-scale crystalline silver particles produced during experimental use of the first embodiment from a silver nitrate solution using a focused CW CO2 laser beam at a power of 300 watts and an exposure time of three minutes.

FIG. 6 shows the SEM micrographs of the nano-scale crystalline silver particles produced from the silver nitrate solution using a focused CW C02 laser-beam at a power of 300 watts and an exposure time of three minutes. Relatively large nano-scale spherical particles were synthesized in the size ranging from 100 to 1000 nm. In addition, agglomerated nano-scale particles have also been produced under these processing conditions.

Figure 7:
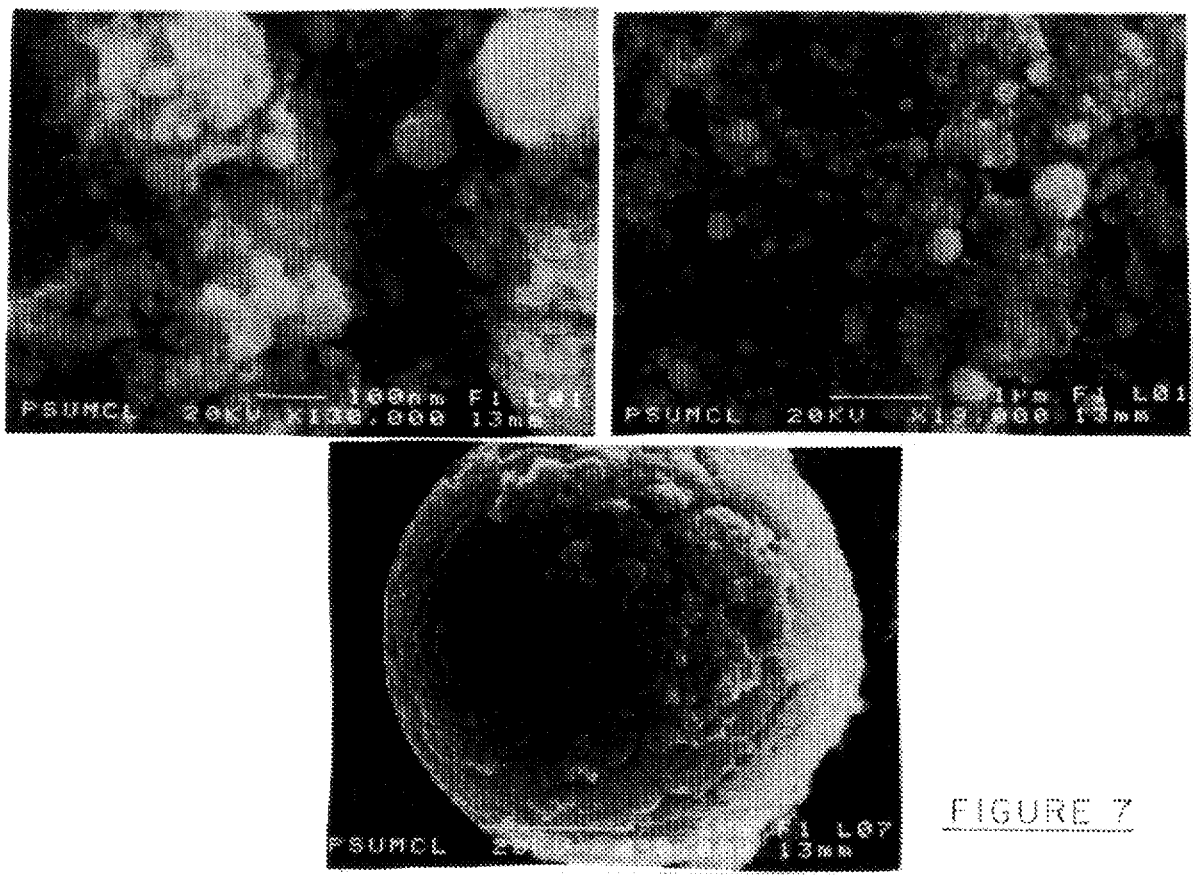
FIG. 7 are the SEM micrographs of the silver particles produced during experimental use of the first embodiment at a beam power of 300 watts and an exposure time of seven minutes.

FIG. 7 shows the SEM micrographs of the silver particles produced at a beam power of 300 watts and a longer exposure time of seven minutes. The major portion of the nano-scale particles produced is an agglomerated mass along with some spherical particles in the size range of 100 to 1000 nm. This can be explained by the fact that higher exposure time resulted in the interaction of the laser beam with the nano-scale particles which caused agglomeration.

Figure 8:
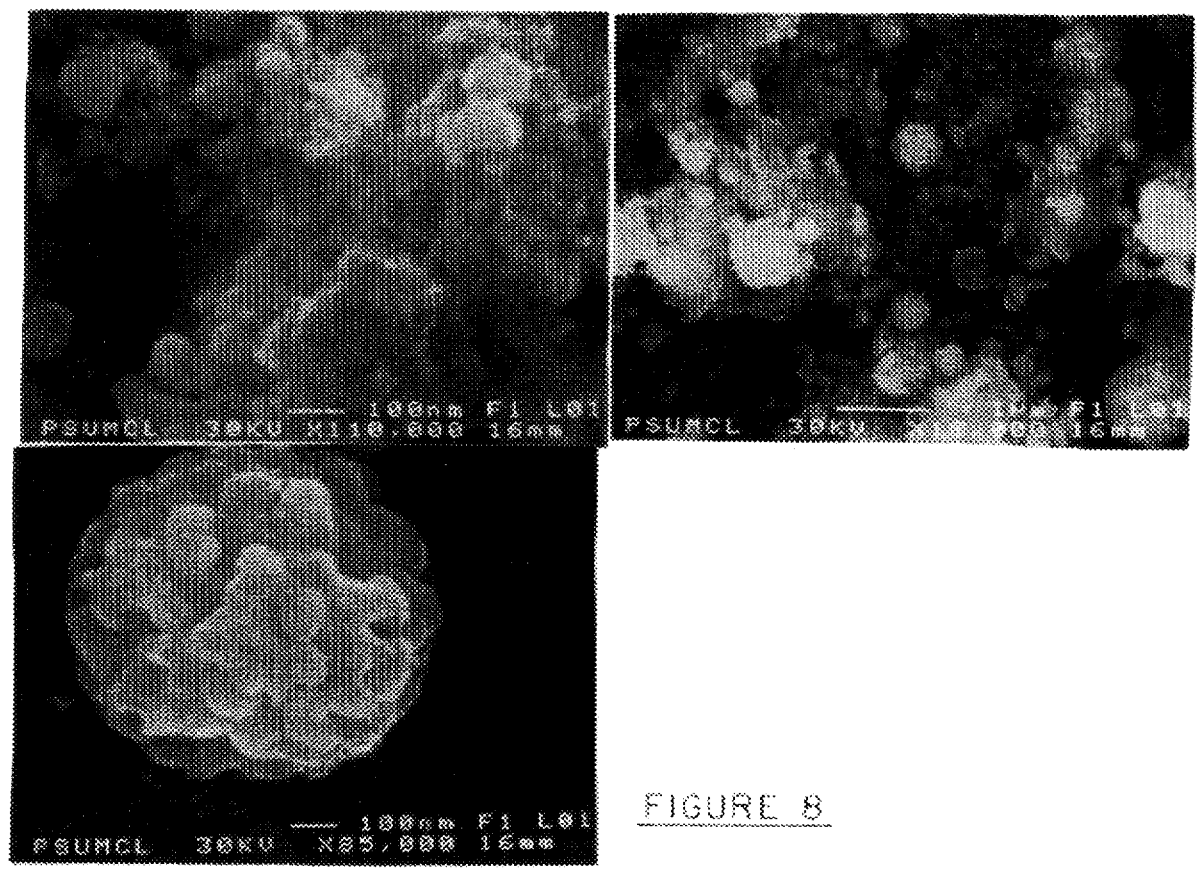
FIG. 8 are the SEM micrographs of the nano-scale crystalline silver particles formed during experimental use of the first embodiment using a defocused CO2 laser beam at a beam power of 400 watts and an exposure time of three minutes.

FIG. 8 shows the SEM micrographs of the nano-scale crystalline silver particles formed by this technique using the defocused C02 laser beam used at a beam power of 400 watts and an exposure time of three minutes. Recirculation of the solution was used to produce these powder particles.

It can be seen from the microstructure that due to re-exposure of the reaction solution to the laser beam, subsequent nucleation and growth of new spherical particles on the particles already formed has taken place. This results in the production of powder particle clusters in the size range of 100 to 1000 nm which consist of several layers of spherical particles. The formation of such clusters of spherical particles can be explained as follows. A spherical particle that formed already by the nucleation and growth acts as a site for nucleation for several new spherical particles which are considerably smaller in size and is of the order of 10 nm. The shape of these special type particles is different from agglomerated particles produced by this technique.

By the first embodiment technique of laser-liquid interaction, high quality nano-scale crystalline particles were synthesized in the size range of 20 to 100 nm at a rate of 3–6 grams/minute. The size, shape synthesis rate and microstructure of silver nano-scale particles were found to be dependent upon the laser processing conditions including laser energy, focus condition, chemical concentration of precursor solutions and interaction time, where the dissociation of silver nitrate molecules results in the formation of nano-scale silver particles and the remaining solution. The remaining solution can be used again to process more silver nitrate.

The successful production of nano-scale silver particles from the silver nitrate solution by the laser beam-liquid interaction method has been shown by this experimental model. Size of the nano-scale particles formed varied from 10 to 1000 nm depending upon the laser processing conditions which included laser beam power, beam diameter, focus condition, laser interaction time and the concentration of the reaction solution. The synthesis rate of nano-scale particles was found to be 5–6 grams per minute. X-ray diffraction and electron microprobe results from the nanoscale particles indicated that high quality silver particles were produced. Using the above mentioned experimental apparatus other nano-scale particles produced were Nickel (Ni), and Nickel (NiO) from a solution of nickel nitrate dissolved in distilled water and Iron oxide ($Fe_2O_3$) from iron nitrate dissolved in distilled water. It is believed that this process and results can be reproduced on a larger scale for commercial production of nano-scale particles.

In the second embodiment, a mixture of a liquid precursor and a carrier gas is injected into a laser beam. The carrier gas can be gases such as He, $N_2$, Ar, etc. This embodiment provides a production rate of making nano-scale particles that is very high and can be scaled-up. A vacuum unit is not required for this process and the process provides for recovery of many materials directly from liquid waste. The process also allows easy control of processing conditions and provides a high quality synthesis of nano-scale particles. Injection of the mixture can be performed either perpendicular or parallel to the laser beam. The setup for injecting the liquid precursor and carrier gas into the laser beam includes plasma nozzle designed to allow the laser beam to enter the plasma nozzle so that the laser beam may irradiate what is flowing through the plasma nozzle to create a plasma flow. The plasma nozzle used would be different depending on whether the injection of the mixture is perpendicular or parallel to the laser beam. The construction of such plasma nozzles in known and is not discussed in detail in this invention.

The carrier gas serves two purposes. The first purpose is that it forms a plasma by interacting with the laser beam. The size of the plume and energy of the plasma will be dependent upon laser processing parameters such as laser power, wavelength, precursor concentration, and interaction time. The second purpose is to atomize the liquid precursor into fine droplets. These fine droplets are also exposed to the laser beam as well as the plasma. The photon energy from laser beam and plasma energy induce the breaking of the molecular bond of the liquid precursor which results in the formation of ultra-fine elemental powders. An example is $2AgNO_3 \rightarrow 2Ag+N_2 +_2$. The size and rate of the ultra-fine elemental powder formation would be dependent upon the above mentioned laser processing conditions. In addition, it would also be dependent upon the flow rate and concentration of the solution and temperature of reaction zone (i.e., plume energy).

Figure 9:
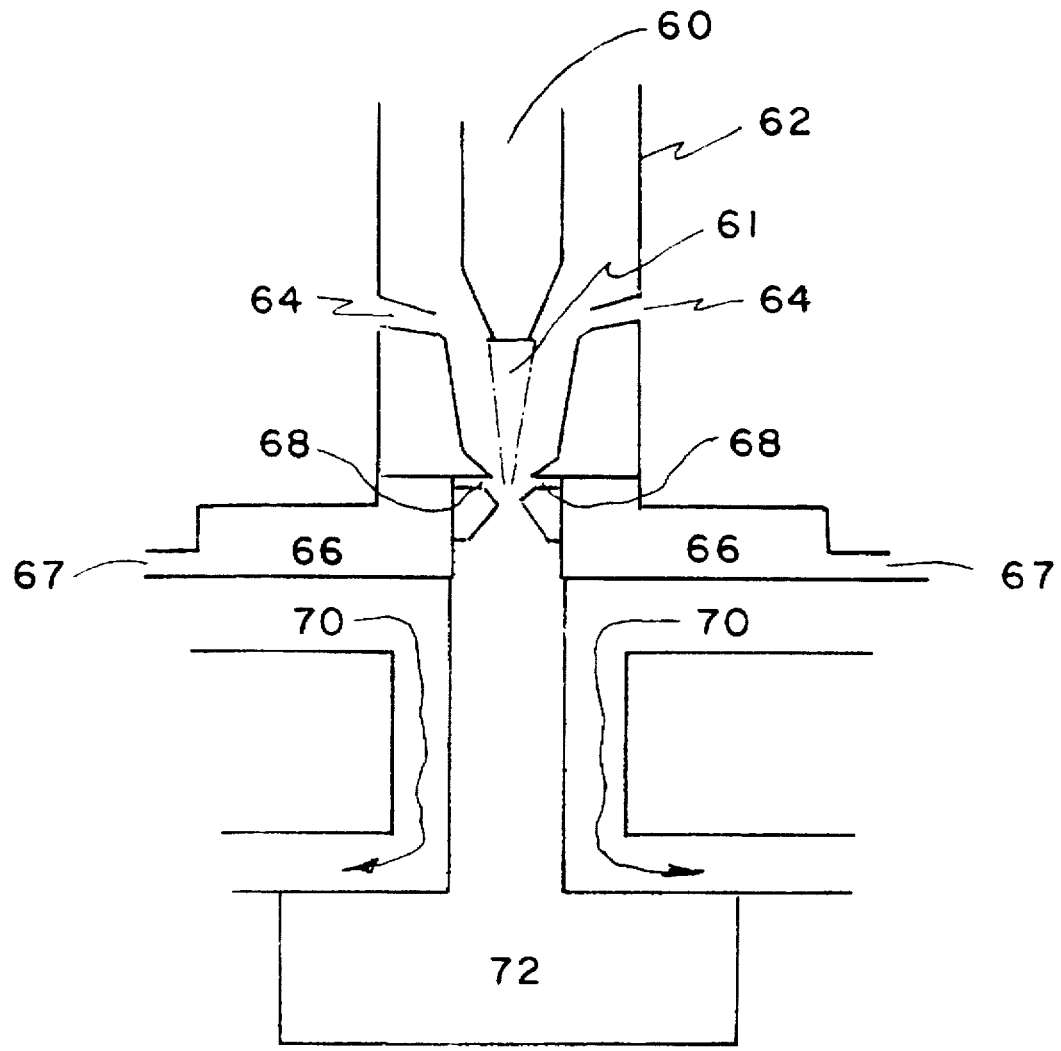
FIG. 9 is a schematic side view of an axial flow plasma nozzle used in the second embodiment of the present invention.

Parallel injection of the mixture requires the setup schematically shown in FIG. 9. FIG. 9 shows a laser 60 and laser beam 61 directed into an axial flow plasma nozzle 62. The carrier gas enters the system from gas input holes 64. The gas input holes 64 are formed to direct the gas downward along the path of the laser beam 61. Fluid feed holes 67 supply pressurized reservoirs 66 with the liquid precursor which in turn supply the liquid precursor to a small gap 68 formed around the nozzle. This allows the liquid precursor to atomize as it is injected into the nozzle 62. The gap 68 is formed so that the liquid precursor is directed along the path of the laser beam 61 and is in the order of size of eight thousands of an inch. The laser beam 61 is focused at the point where the liquid precursor enters the nozzle 62 to effectuate the process. Cooling channels 70 are used to allow a cooling fluid to flow around the nozzle 62 for cooling purposes. At the bottom of the nozzle 62 is a reservoir 72 for collecting the ultra-fine powder. The reservoir 72 is vented to release the remaining gases.

Figure 10:
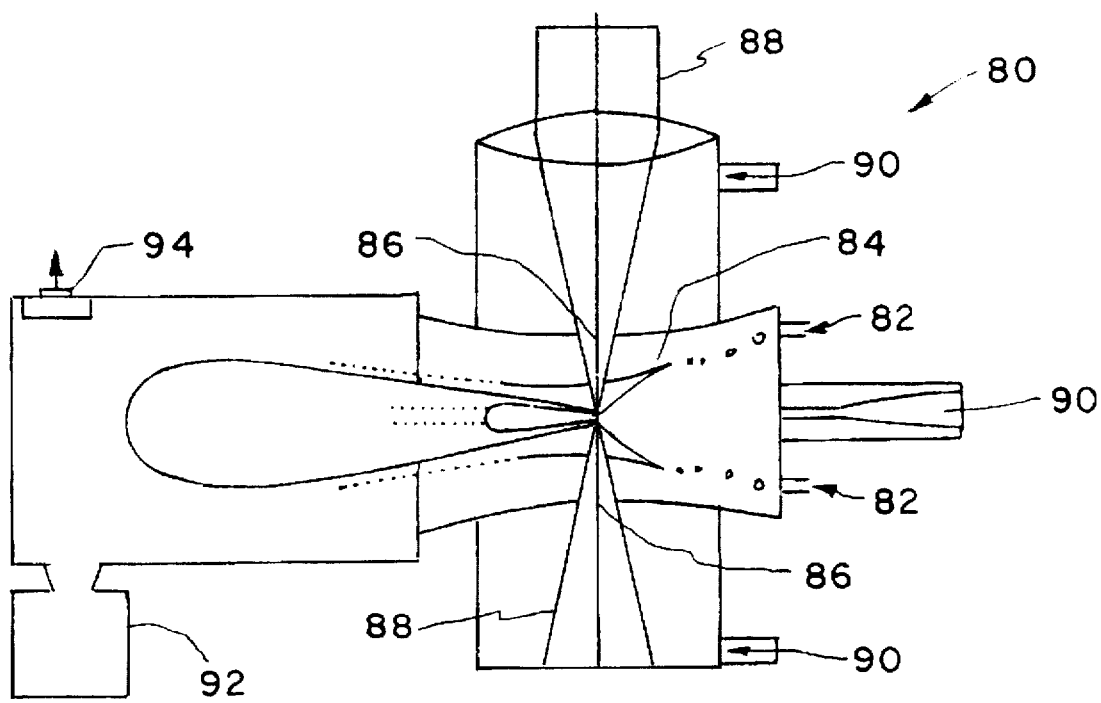
FIG. 10 is a schematic side view of a transverse flow plasma nozzle used in the second embodiment of the present invention.

Perpendicular injection of the mixture requires the setup shown in FIG. 10. FIG. 10 schematically illustrates a transverse flow plasma nozzle 80. The plasma nozzle 80 includes two mixture inputs 82 for injection of the mixture of liquid precursor and carrier gas into a converging-diverging reaction chamber 84. The reaction chamber 84 has two aligned holes 86 at the mid-point of the reaction chamber 84 to allow the entrance of a laser beam 88 which is perpendicular to the flow of the mixture. The plasma nozzle 80 also has three gas inputs 90. Carrier gas of the type used in the mixture is injected in the gas inputs 90 to equalize the pressure in the reaction chamber 84 and force the mixture to flow from the reaction chamber 84 to a collection chamber 92. The laser beam 88 is focused at the flow of the mixture in the reaction chamber 84. Once the laser beam 88 has interacted with the mixture in the reaction chamber 84, the processed mixture flow continues into the collection chamber 92 where the ultra-fine powder settles to the bottom of the collection chamber 92 and the remaining gases are vented out a filter 94.

Figure 11:
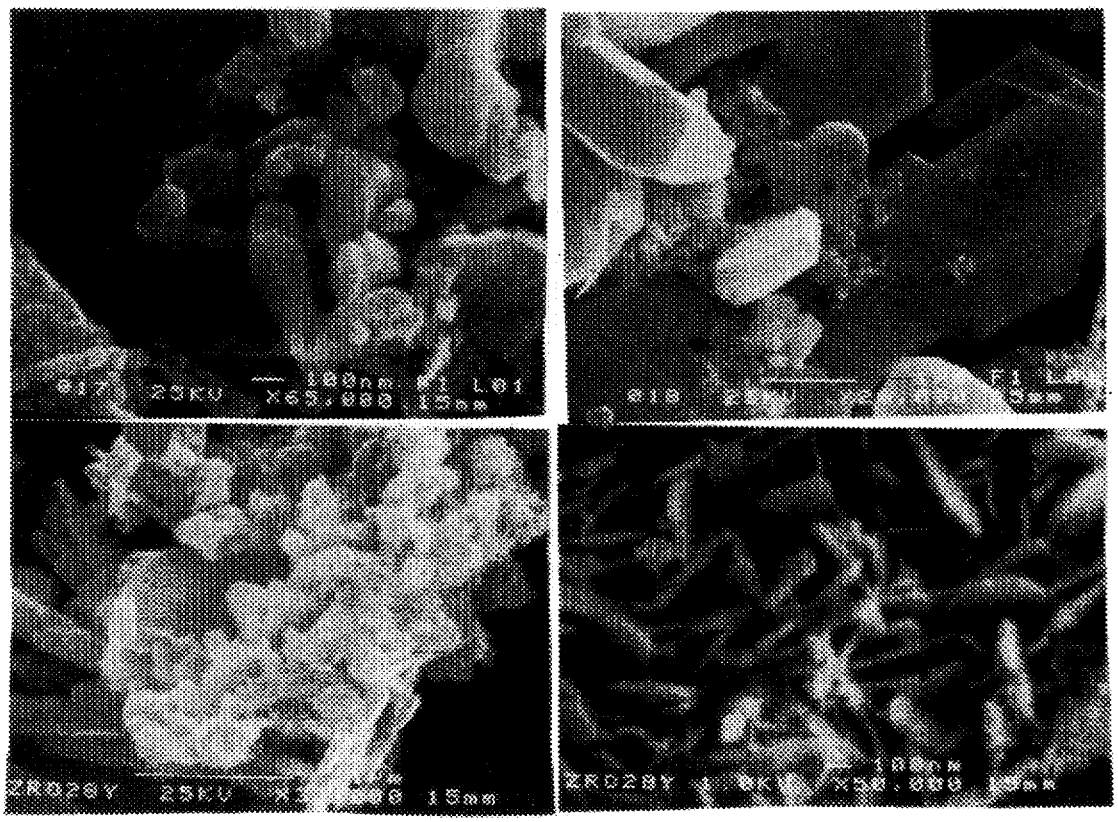
FIG. 11 are SEM micrographs of silver nano-scale particles synthesized from the silver nitrate solution using the second embodiment of the present invention.

Experimental Production of Silver Nano-scale Particles using the Second Embodiment A preliminary experiment was conducted using the perpendicular setup of the second embodiment for the synthesis of silver (Ag) nano-scale particles using silver 20 nitrate ($AgNO_3$) dissolved in water as the liquid precursor to the point of saturation of the solution. A continuous wave CO2 laser (300 watts) was used for the dissociation of the silver nitrate solution. The reaction chamber converged from one hundred thousands of an inch to sixty thousands of an inch and diverged back to one hundred thousands of an inch. The input pressure of the carrier gas and the mixture at their respective inputs was sixty pounds per square inch. FIG. 11 shows SEM micrographs of silver nano-scale particles synthesized from the silver nitrate solution.

Figure 12:
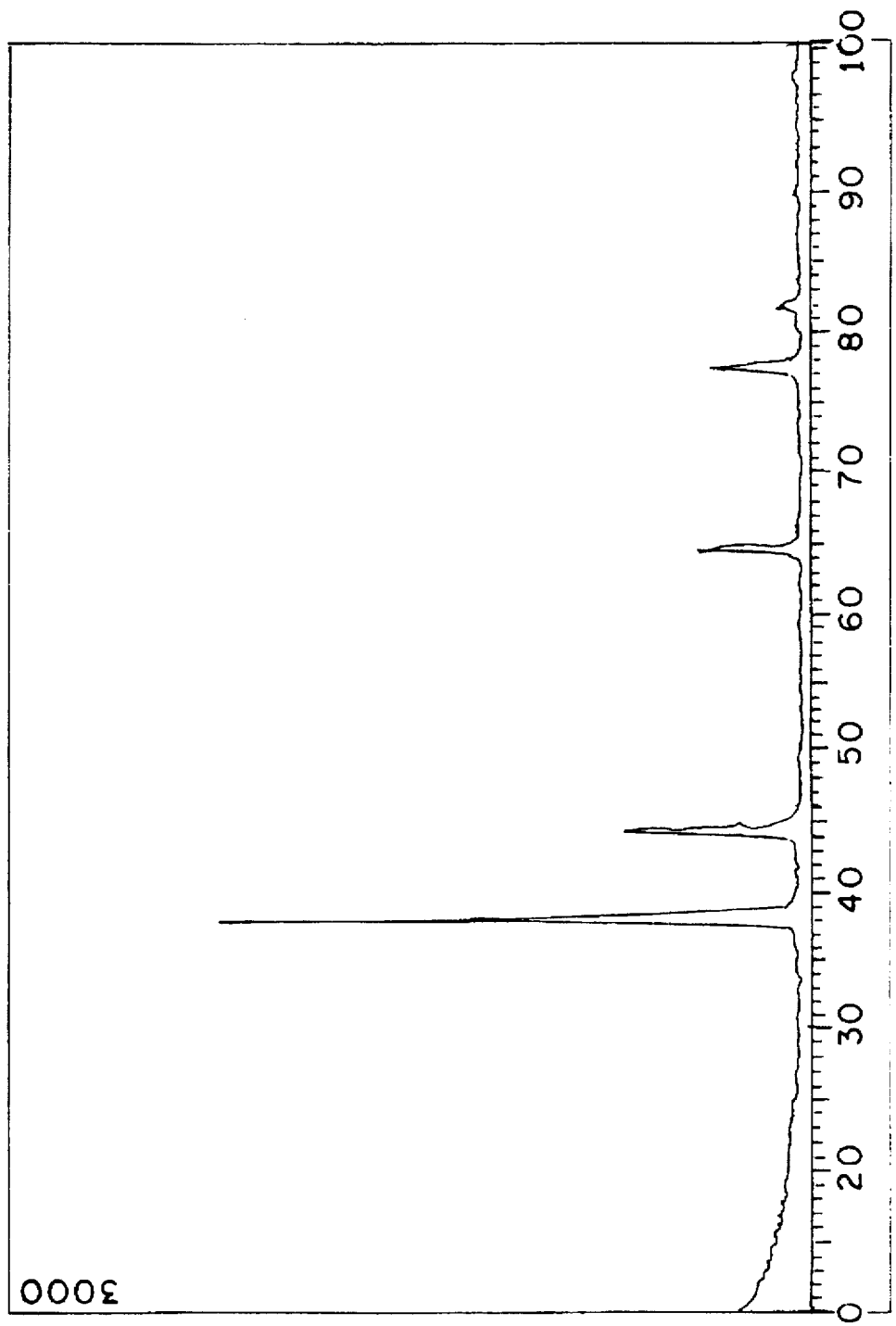
FIG. 12 is an X-ray graph from the bulk silver nitrate crystals as an initial starting material and silver nano-scale particles after synthesis using the second embodiment of the present invention.
Figure 13:
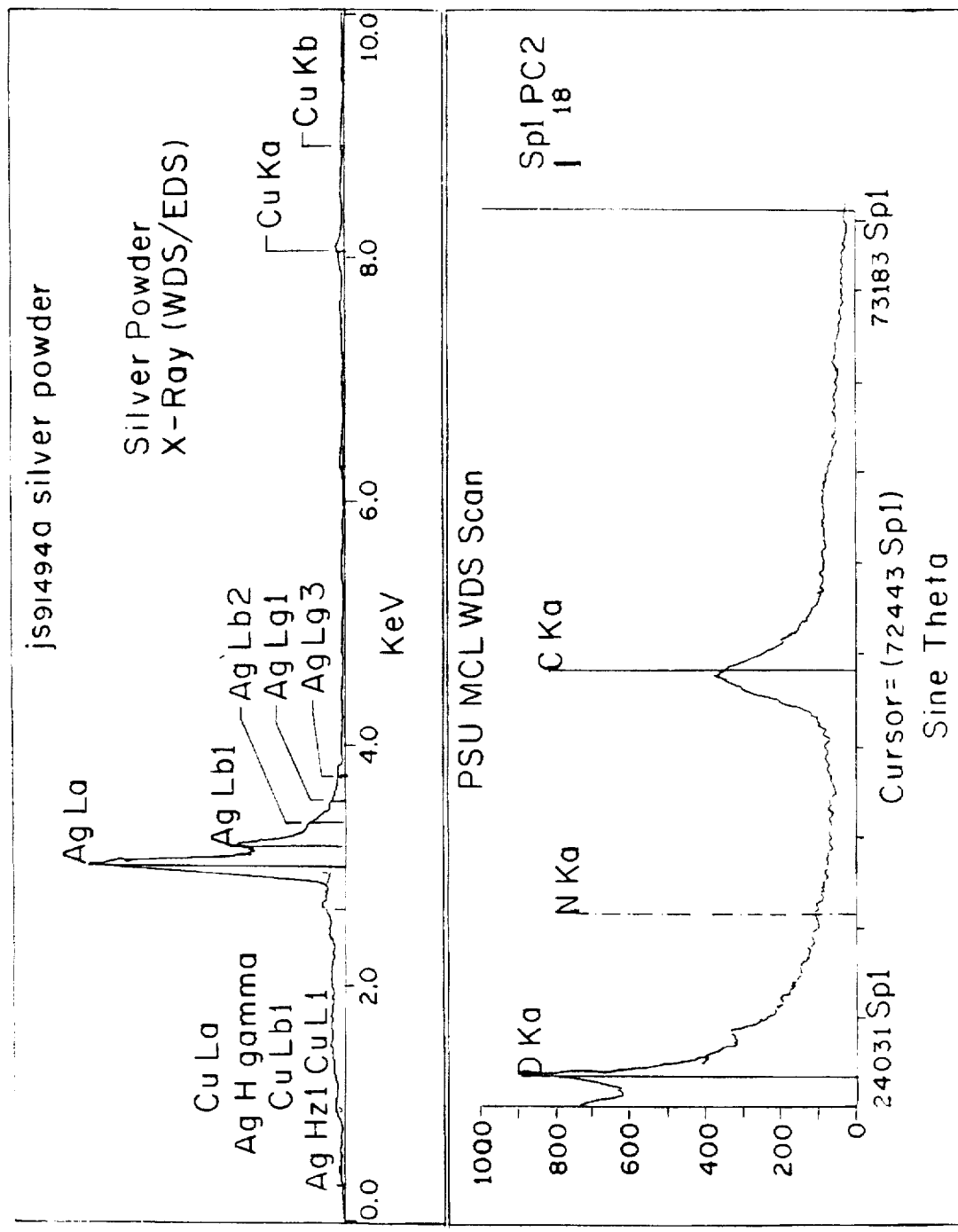
FIG. 13 is an X-ray (WDS/EDS) graph from the single silver nano-scale particles using the second embodiment of the present invention.
Figure 14:
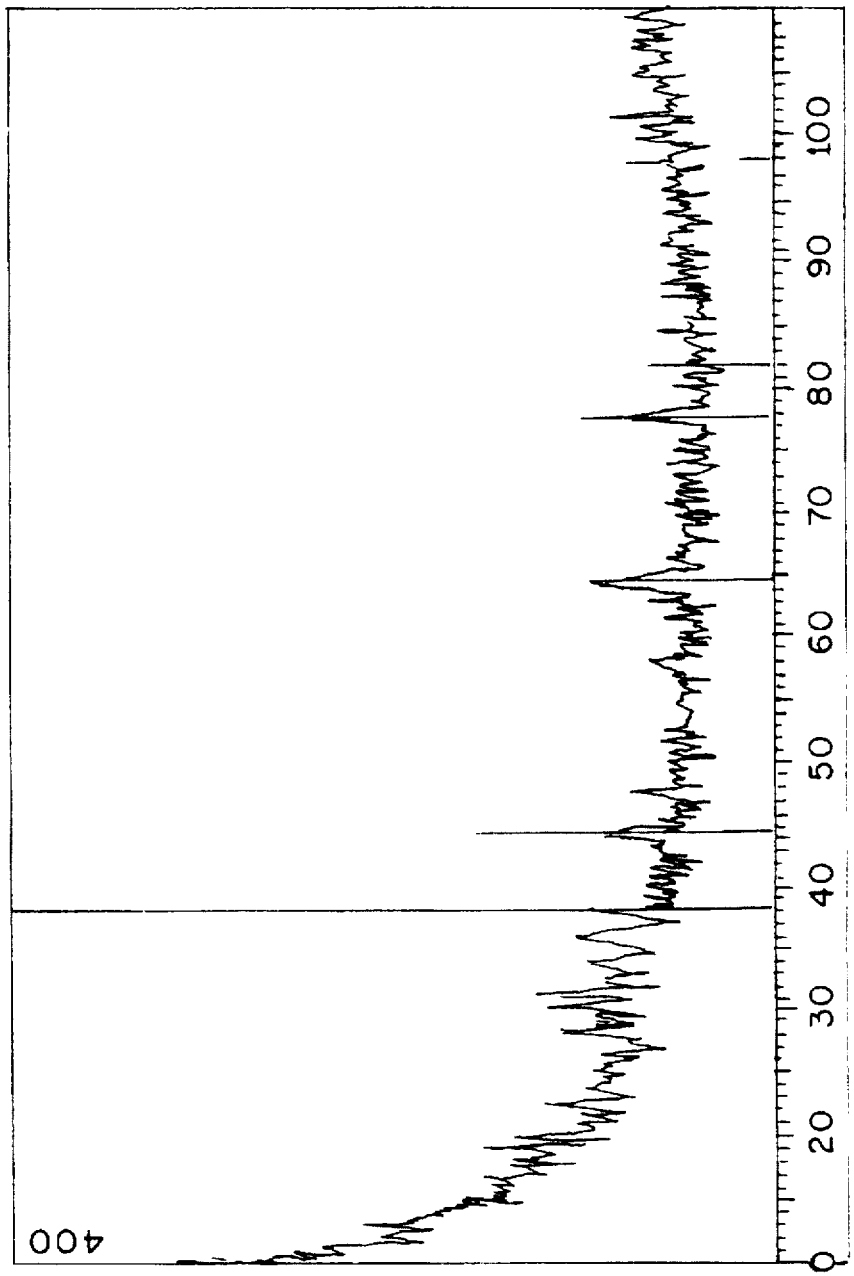
FIG. 14 is an X-ray graph showing the results during the recovery of silver particles from photographic waste solution.

The size of the silver particles varied from 10 to 50 nm depending upon the laser processing conditions (laser power, wavelength, precursor concentration, and interaction time). FIG. 12 shows an X-ray from the bulk silver nitrate crystals as an initial starting material and silver nano-scale particles after synthesis. FIG. 13 shows X-ray (WDS/EDS) from the single silver nano-scale particles showing a high grade of silver particles synthesized without forming any compounds of silver such as silver oxide, or nitride. This same setup was also used in the recovery of silver particles from photographic waste solutions as shown in FIG. 14. Similar results were obtain when the silver nitrate was dissolved in a glycol solution and similar results were also obtained when the parallel setup of the second embodiment was used.

Figure 15:
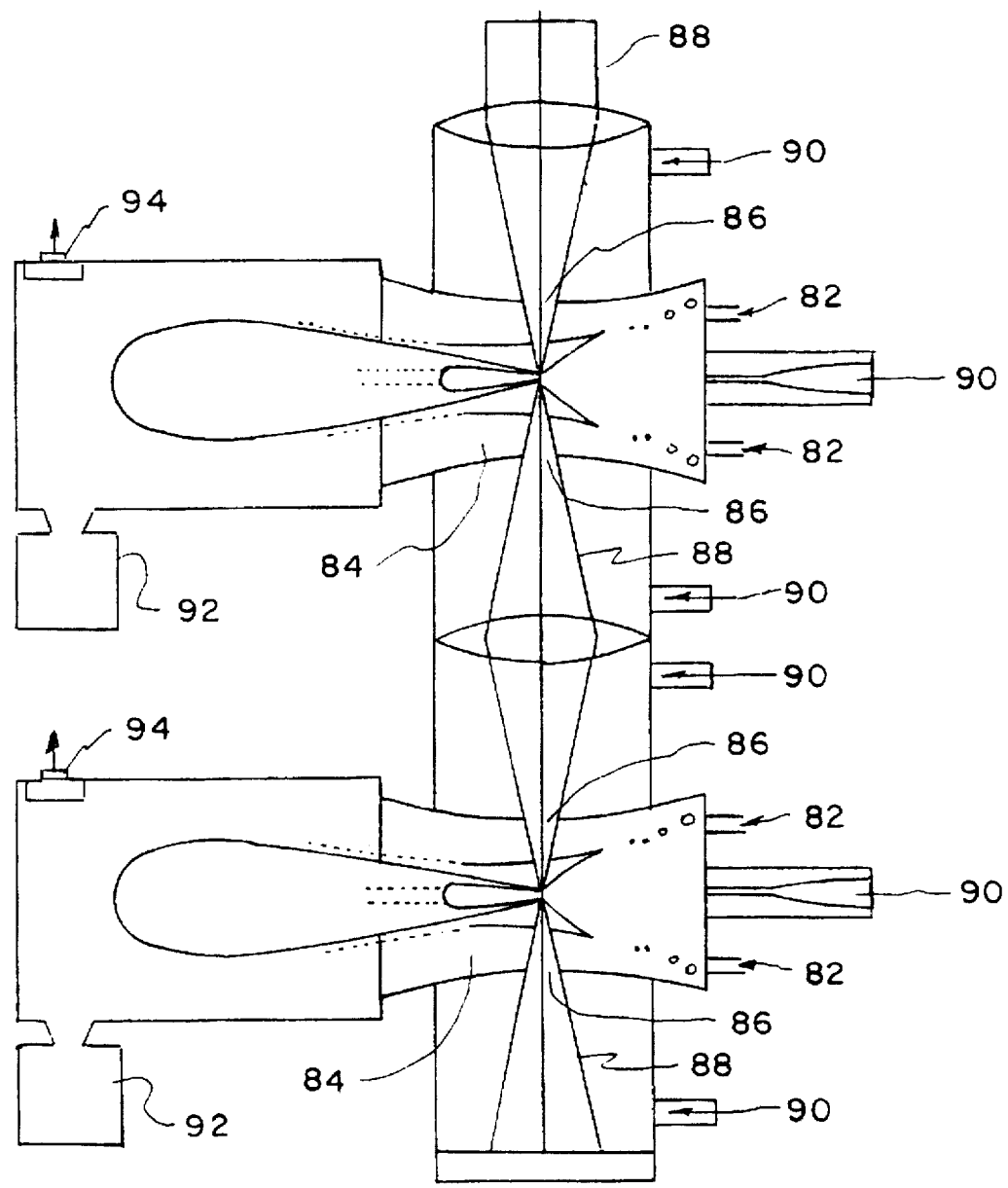
FIG. 15 is a schematic side view of a multi-station version of the apparatus used in the second embodiment of the perpendicular setup.

It is estimated that only ten percent of the total laser beam power available was utilized in the synthesis of the silver nano-scale particles using the perpendicular setup. Remaining laser power could be utilized by developing multi-stations in the synthesis of nano-scale particles as shown in FIG. 15. A lens 98 would be needed between each station to refocus the laser beam at the next reaction chamber 84. The multi-station set-up in the path of the laser beam would allow for the synthesis of varieties of materials simultaneously. It has been estimated that the cost of setting-up one work station including CO2 laser having a power of 500 watts would be paid off by continuously running the setup for 24 hours. In addition, this process is environmentally compliant.

The second embodiment saves energy in the following three ways. First, this novel approach uses laser energy in the form of photon energy. It can be used in a closed loop, thus, laser energy can be redirected using multiple reflecting mirrors or forming multiple work stations as shown in FIG. 15, providing complete utilization of the laser beam. Second, processing or sintering temperature of the nano-scale particle materials depends upon its size. The smaller the desired size of the nano-scale particles, the lower the sintering temperatures, thus there will be direct saving of the energy. Finally third, focused sun light can also be used as a form of energy to synthesize nano-scale particles from liquid precursor, which is a different source of energy.

We claim:

1. A process for producing nano-scale particles comprising the steps of:

a. placing a substrate on a rotatable specimen holder that is inside a reactive chamber, where said specimen holder is rotatable by a drive source;

b. filling said reactive chamber with a liquid precursor solution to a level above said substrate;

c. rotating said specimen holder and therefore said substrate by engaging said drive source;

d. irradiating said rotating substrate and said liquid precursor solution with a laser beam;

e. removing irradiated liquid precursor solution from said reactive chamber; and f. separating nano-scale particles from the irradiated liquid precursor solution by use of a centrifugal separator.

2. The process as claimed in claim 1, wherein said reactive chamber is filled with liquid precursor solution until it is at a level of about 3 to 4 millimeters above said substrate.

3. The process as claimed in claim 2, wherein said specimen holder and said substrate are rotated at a range from 0 to 1000 revolutions per minute.

4. The process as claimed in claim 3, wherein said substrate and liquid precursor solution are irradiated for a time period of 3 to 7 minutes.

5. A process for producing nano-scale particles comprising the steps of:

a. mixing a liquid precursor solution with a carrier gas creating a mixture for injection into a plasma nozzle;

b. irradiating said mixture with a laser beam while said mixture is flowing through said plasma nozzle;

c. allowing nano-scale particles to settle from said irradiated mixture into a collection chamber;

d. allowing remaining gases to vent from said collection chamber;

and collecting said nano-scale particles from said collection chamber.

6. The process as claimed in claim 5, wherein said carrier gas and liquid precursor are injected separately into an axial flow plasma nozzle in a parallel direction to said laser beam direction.

7. The process as claimed in claim 6, wherein said liquid precursor is atomized as it is injected into the axial flow plasma nozzle.

8. The process as claimed in claim 5, wherein said carrier gas and liquid precursor are premixed and injected into a transverse flow plasma nozzle in a direction perpendicular to said laser beam.

\* \* \* \* \*